(12) United States Patent
Jeffrey

(10) Patent No.: US 8,086,073 B2
(45) Date of Patent: Dec. 27, 2011

(54) NON-UNIFORM IMAGE RESIZER

(75) Inventor: Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 967 days.

(21) Appl. No.: 12/027,438

(22) Filed: Feb. 7, 2008

(65) Prior Publication Data
US 2009/0202177 A1 Aug. 13, 2009

(51) Int. Cl.
G06K 9/32 (2006.01)

(52) U.S. Cl. ......... 382/298; 382/299

(58) Field of Classification Search ......... None
See application file for complete search history.

(56) References Cited

U.S. PATENT DOCUMENTS

| 5,408,269 | A | | 4/1995 | Tsukagoshi | |
|---|---|---|---|---|---|
| 5,469,222 | A | * | 11/1995 | Sprague | 348/580 |
| 5,481,304 | A | * | 1/1996 | Park et al. | 348/240.2 |
| 5,489,940 | A | | 2/1996 | Richardson et al. | |
| 5,539,534 | A | | 7/1996 | Hino et al. | |
| 5,570,135 | A | * | 10/1996 | Gove et al. | 348/581 |
| 5,739,852 | A | | 4/1998 | Richardson et al. | |
| 5,796,095 | A | | 8/1998 | Matsuyama et al. | |
| 5,960,126 | A | | 9/1999 | Nielsen et al. | |
| 6,016,152 | A | * | 1/2000 | Dickie | 345/648 |
| 6,188,382 | B1 | * | 2/2001 | Okamura et al. | 345/669 |
| 6,333,792 | B1 | * | 12/2001 | Kimura | 358/1.2 |
| 6,366,292 | B1 | | 4/2002 | Allen | |
| 6,801,252 | B1 | | 10/2004 | Kawada et al. | |
| 6,873,358 | B1 | | 3/2005 | Shimizu | |
| 6,961,481 | B2 | * | 11/2005 | Lee et al. | 382/300 |
| 7,545,391 | B2 | * | 6/2009 | Le Dinh et al. | 345/660 |
| 7,606,443 | B2 | * | 10/2009 | Chou et al. | 382/300 |
| 7,907,788 | B2 | * | 3/2011 | Kawabe | 382/266 |
| 7,999,867 | B2 | * | 8/2011 | Noh | 348/252 |
| 2002/0191866 | A1 | * | 12/2002 | Tanabe | 382/298 |
| 2003/0021490 | A1 | * | 1/2003 | Okamoto et al. | 382/284 |
| 2003/0178835 | A1 | * | 9/2003 | Nishimoto et al. | 280/801.2 |
| 2004/0017492 | A1 | | 1/2004 | Stavely | |
| 2005/0226539 | A1 | * | 10/2005 | Schweng | 382/300 |
| 2007/0201744 | A1 | * | 8/2007 | Sanami | 382/173 |
| 2008/0089585 | A1 | * | 4/2008 | Yashima et al. | 382/173 |

FOREIGN PATENT DOCUMENTS

| JP | 05334427 | 12/1993 |
|---|---|---|
| JP | 05336514 | 12/1993 |
| JP | 6197288 | 7/1994 |
| JP | 07107273 | 4/1995 |
| JP | 2001094858 | 4/2001 |
| JP | 2004153668 | 5/2004 |
| JP | 2005348320 | 12/2005 |
| JP | 2006074782 | 3/2006 |
| WO | 2005001547 A1 | 1/2005 |

* cited by examiner

Primary Examiner — Vikkram Bali
Assistant Examiner — Michelle Entezari
(74) Attorney, Agent, or Firm — Mark P. Watson

(57) ABSTRACT

A method for producing a scaled output image by manipulating image data from an input image is disclosed. The scaled output image can have non-uniformly scaled regions and a uniformly scaled region. The method includes an operation that defines pixel locations within the uniformly scaled region of the output image based on uniformly scaling a portion of the input image. There is also an operation that determines a non-uniform scale factor. The non-uniform scale factor is used to define a gap between pixel locations within the non-uniformly scaled regions. Another operation determines error correction values within the non-uniformly scaled regions. The method can also include an operation that defines pixel locations for the non-uniformly scaled region of the output image based on increments of the non-uniform scale factor and error correction values.

26 Claims, 12 Drawing Sheets

|  | $N_{12}$ | $N_{13}$ | $N_{14}$ | $N_{15}$ |
|---|---|---|---|---|
| error added | 12/20 | 24/20 | 36/20 | 48/20 |
| cumulative error | 12/20 | 36/20 | 52/20 | 60/20 |
| integer part of cumulative error | 0 | 1 | 2 | 3 |
| adjusted cumulative error | 12/20 | 16/20 | 12/20 | 0 |
| HScale | 409 | 306 | 203 | 100 |
| adjusted HScale | 409 | 307 | 205 | 103 |

|  | $N_1$ | $N_2$ | $N_3$ | $N_4$ | $N_5$ |
|---|---|---|---|---|---|
| error added | 22/30 | 44/30 | 66/30 | 88/30 | 110/30 |
| cumulative error | 22/30 | 66/30 | 72/30 | 100/30 | 120/30 |
| integer part of cumulative error | 0 | 2 | 2 | 3 | 4 |
| adjusted cumulative error | 22/30 | 6/30 | 12/30 | 10/30 | 0 |
| HScale | 437 | 374 | 311 | 248 | 185 |
| adjusted HScale | 437 | 376 | 313 | 251 | 189 |

NON-UNIFORM IMAGE RESIZER

BACKGROUND OF THE INVENTION

With the proliferation of digital camera technology, higher resolution digital cameras are finding their way into more and more consumer electronics. Mobile devices such as cellular or mobile telephones and other portable wireless devices, have benefited from the improved compactness and increased resolution of small digital cameras. This is evident from the increased number of mobile devices that incorporate a digital camera.

Images captured by digital cameras within mobile devices are often displayed on external displays such as television and computer monitors. With the continued adoption of high-definition television, widescreen displays are becoming more common and consumers often desire an image to fill the entire screen. However, many digital cameras capture images in a 4:3 aspect ratio rather than the widescreen 16:9 aspect ratio. Unfortunately, uniform scaling of a 4:3 aspect ratio image to fit a 16:9 aspect ratio display can lead to unwanted and unsightly distortion. In view of the forgoing, there is a need for a non-uniform image resizer.

SUMMARY

In one embodiment, a method for producing a scaled output image by manipulating image data from an input image is disclosed. The scaled output image can have non-uniformly scaled regions and a uniformly scaled region. The method includes an operation that defines pixel locations within the uniformly scaled region of the output image based on uniformly scaling a portion of the input image. There is also an operation that determines a non-uniform scale factor. The non-uniform scale factor is used to define a gap between pixel locations within the non-uniformly scaled regions. Another operation determines error correction values within the non-uniformly scaled regions. The method can also include an operation that defines pixel locations for the non-uniformly scaled region of the output image based on increments of the non-uniform scale factor and error correction values.

In another embodiment, a method for resizing image data from a first image size to a second image size is disclosed. The method may include an operation to uniformly resize a first region of the first size image data through a constant scale factor based on a number of gaps between pixels in the first region of the first size image and a number of gaps between pixels in a corresponding first region of the second sized image. The method may also include operations to non-uniformly resize a second region of the first size image data through a changing scale factor for each pixel location of the second region of the first size image data to define pixel locations for a corresponding second region of the second size image data.

In yet another embodiment, a resizer for scaling image data is disclosed. The resizer includes a non-uniform resizer configured to apply a non-uniform scale factor. The non-uniform scale factor can be determined based on a number of gaps between uniformly spaced pixels in an input image and a number of gaps between pixels in a region of non-uniformly scaled pixels in an output image size. The non-uniform resizer may also be configured to determine and apply pixel offset values in order to determine output pixel locations within the output image.

In still another embodiment, a method for resizing an input image is disclosed. The method includes operations to determine a non-uniform scale factor, the non-uniform scale factor used to define a gap between output pixels within a non-uniformly scaled region. In another operation, the method determines error correction values for adjusting output pixel locations within the non-uniformly scaled region. The method also includes an operation to define output pixel locations within the non-uniformly scaled region of an output image based on increments of the non-uniform scale factor and error correction values.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for an image resizer capable of scaling input images to an output image having a uniformly scaled region and a non-uniformly scaled region. Throughout this description, the following terms and phrases are used and should be accorded their respective definitions as follows. Input image is defined as an original image. Output image is defined as the new image. InWidth is defined as the width of the input image. OutWidth is defined as the width of the output image. InUni is defined as the width of the input image that is uniformly scaled. InNonUniR is defined as the width of the right side of the non-uniformly scaled input image. InNonUniL is defined as the width of the left side of the non-uniformly scaled input image. OutUni is defined as the width of the center region of the output image that is uniformly scaled. OutNonUniR is defined as the width of the right side of the non-uniformly scaled output image. OutNonUniL is defined as the width of the left side of the non-uniformly scaled output image. HScale is defined as the amount that is added to the accumulator when determining pixel output locations.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
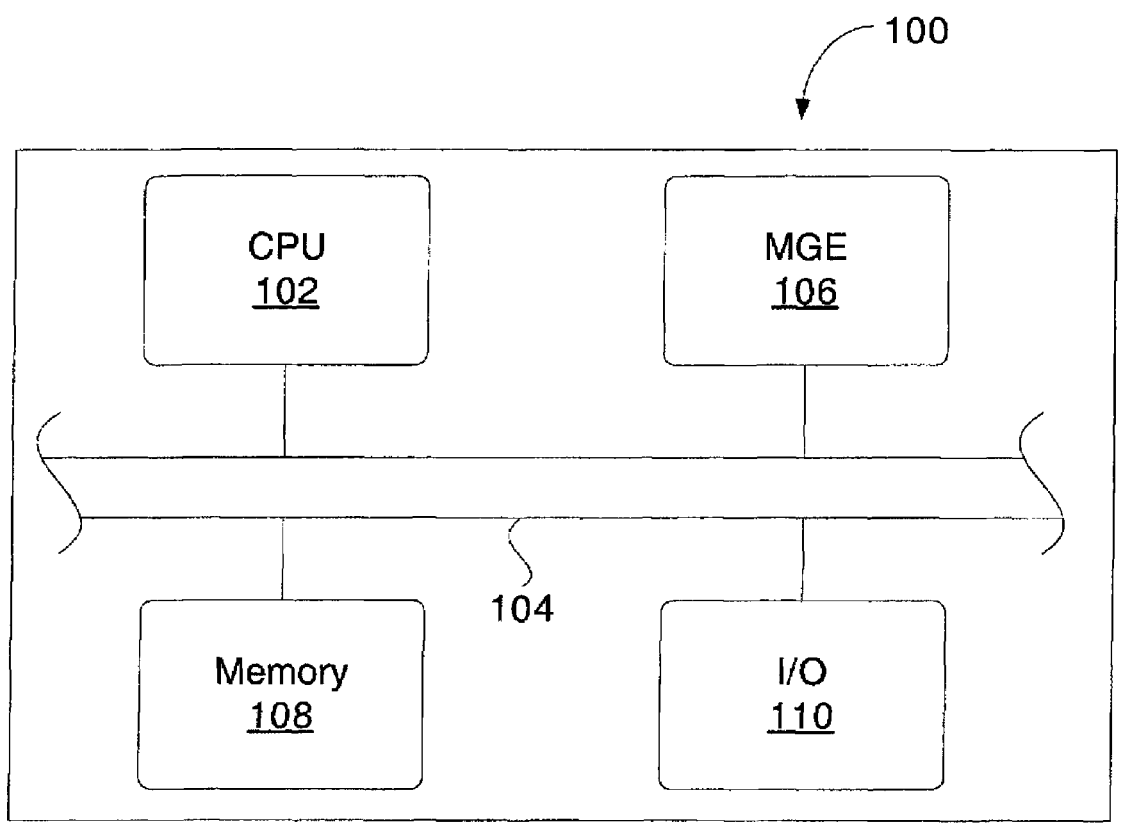
FIG. 1 is a simplified schematic diagram illustrating a high level architecture of a device 100 implementing a non-uniform image resizer in accordance with one embodiment of the present invention.

FIG. 1 is a simplified schematic diagram illustrating a high level architecture of a device 100 implementing a non-uniform image resizer in accordance with one embodiment of the present invention. The device 100 includes a processor 102, a graphics controller or Mobile Graphic Engine (MGE) 106, a memory 108, and an Input/Ouput (I/O) interface 110, all capable of communicating with each other using a bus 104.

Those skilled in the art will recognize that the I/O interface 110 allows the components illustrated in FIG. 1 to communicate with additional components consistent with a particular application. For example, if the device 100 is a portable electronic device such as a cell phone, then a wireless network interface, random access memory (RAM), digital-to-analog and analog-to-digital converters, amplifiers, keypad input, and so forth will be provided. Likewise, if the device 100 is a personal data assistant (PDA), various hardware consistent with a PDA will be included in the device 100.

The processor 102 performs digital processing operations and communicates with the MGE 106. The processor 102 can be an integrated circuit capable of executing instructions retrieved from the memory 108. These instructions provide the device 100 with functionality when executed on the processor 102. The processor 102 may also be a digital signal processor (DSP) or other processing device that incorporates a DSP.

The memory 108 may be random-access memory or non-volatile memory. The memory 108 may be non-removable memory such as embedded flash memory or other EEPROM, or even magnetic media. Alternatively, the memory 108 may take the form of a widely available removable memory such as formats and sold under such trade names such as "micro SD", "miniSD", "SD Card", "Compact Flash", and "Memory Stick." The memory 108 may also be any other type of machine-readable removable or non-removable media. In other embodiments, the memory 108 may be separate from the device 100 and require access via wired or wireless communications. For example, the memory 108 may be connected to the device 100 via a communications port (not shown), such as a BLUETOOTH® interface or an IEEE 802.11 interface, commonly referred to as "Wi-Fi". Such an interface may connect the device 100 with a host (not shown) for transmitting data to and from the host. If the device 100 is a communications device such as a cell phone, the device 100 may include a wireless communications link to a carrier, which may then store data on machine-readable media as a service to customers, or transmit data to another cell phone or email address. Furthermore, the memory 108 may be a combination of memories. For example, it may include both a removable memory for storing media files such as music, video or image data, and a non-removable memory for storing data such as software executed by the processor 102.

Figure 2:
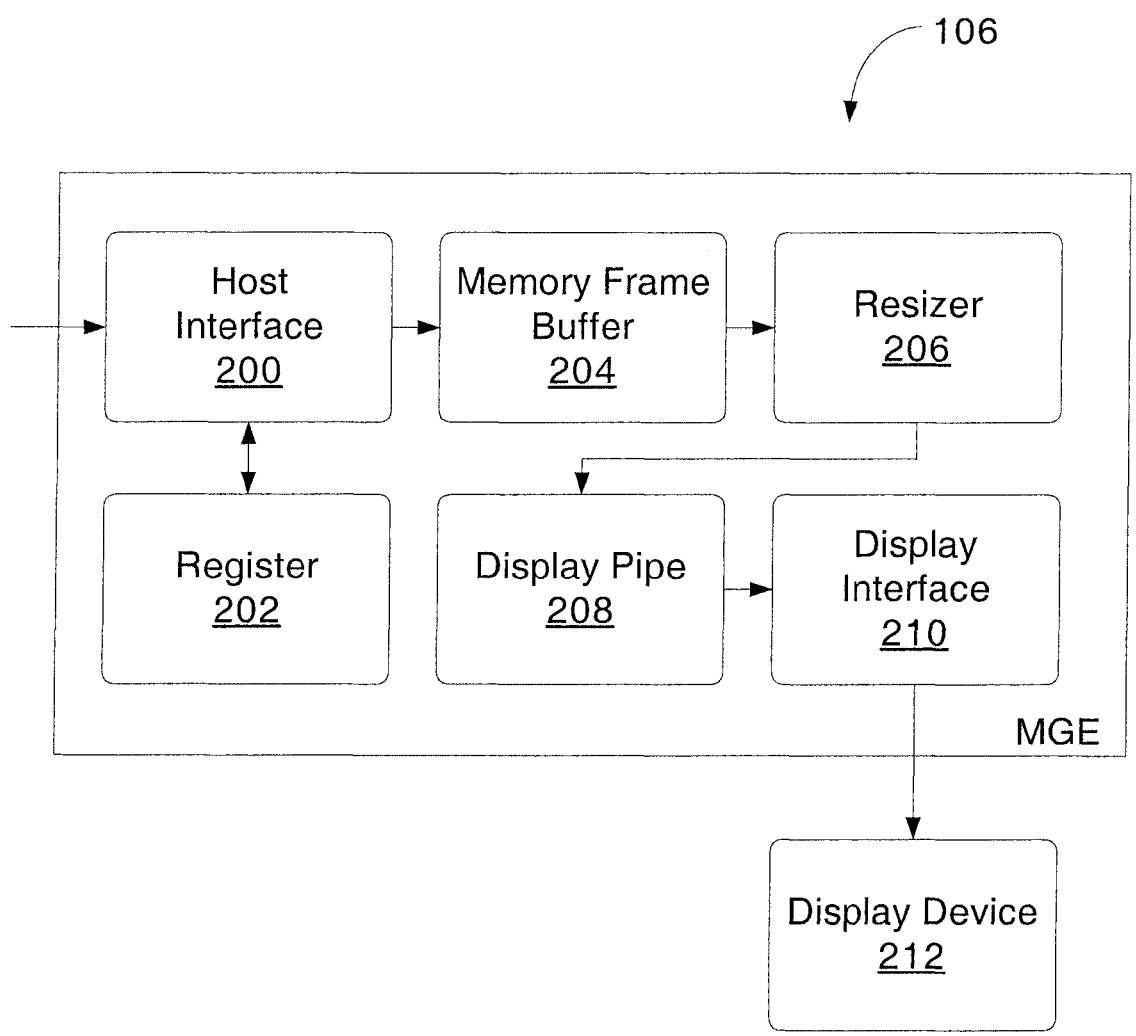
FIG. 2 is a simplified schematic diagram illustrating a high level architecture for the graphics controller 106 in accordance with one embodiment of the present invention.

FIG. 2 is a simplified schematic diagram illustrating a high level architecture for the graphics controller 106 in accordance with one embodiment of the present invention. The graphics controller 106 can accept input to host interface module 200. For example, the host interface module 200 can receive pixel data to be processed by the graphics controller 106. As previously discussed, the graphics controller 106 can also be referred to as an MGE or alternatively, a Liquid Crystal Display Controller (LCDC) or a Graphics Processing Unit (GPU). Additionally, the host interface module 200 can also receive various signals synchronizing various buses and clocks to ensure proper communications to other components of the device. The host interface 200 can also bi-directionally communicate with a register 202. The register 202 can broadly be defined as a storage area for hardware input/output. Though the register 202 is shown as a single module, in other embodiments registers can be distributed throughout the graphics controller 106. Registers can be associated with components of the graphics controller 106 that are illustrated in FIG. 2 along with additional components that are not illustrated for simplicity. Also connected to the host interface 200 is a memory frame buffer 204. The memory frame buffer 204 can broadly be defined as a storage area for pixel data. In one embodiment, the memory frame buffer 204 can be a first-in-first-out (FIFO) buffer. Other embodiments can use different types or techniques to buffer pixel data. One skilled in the art should recognize that the examples provided are intended to be exemplary and do not limit the scope of this disclosure.

A resizer module 206 can receive pixel data from the memory frame buffer 204 and the resizer module 206 can include logic capable of calculating and manipulating pixel data to non-uniformly resize portions of the input image. The resizer module 206 can resize an input image based on manipulating the distance, or gaps, between adjacent pixels. As will be described in further detail below, decreasing the distance between adjacent pixels, results in zooming in. Conversely, increasing the distance between adjacent pixels results in zooming out. Pixel data for an output image, or resized image, can then go to a display pipe 208. Broadly defined, the display pipe 208 is a memory capable of storing pixel data for the resized image. In one embodiment, the display pipe 208 can be a FIFO buffer. Connected to the display pipe 208 is a display interface 210. The display interface 210 can be used to manipulate pixel data from the display pipe 208 so the pixel data can be properly formatted for a display device 212. In some embodiments, the display device 212 is integrated into the device such as displays for mobile phones, portable video game systems and smart phones. In other embodiments, the display device 212 can be external to the device requiring an external connection such as a discrete computer monitor.

Figure 3:
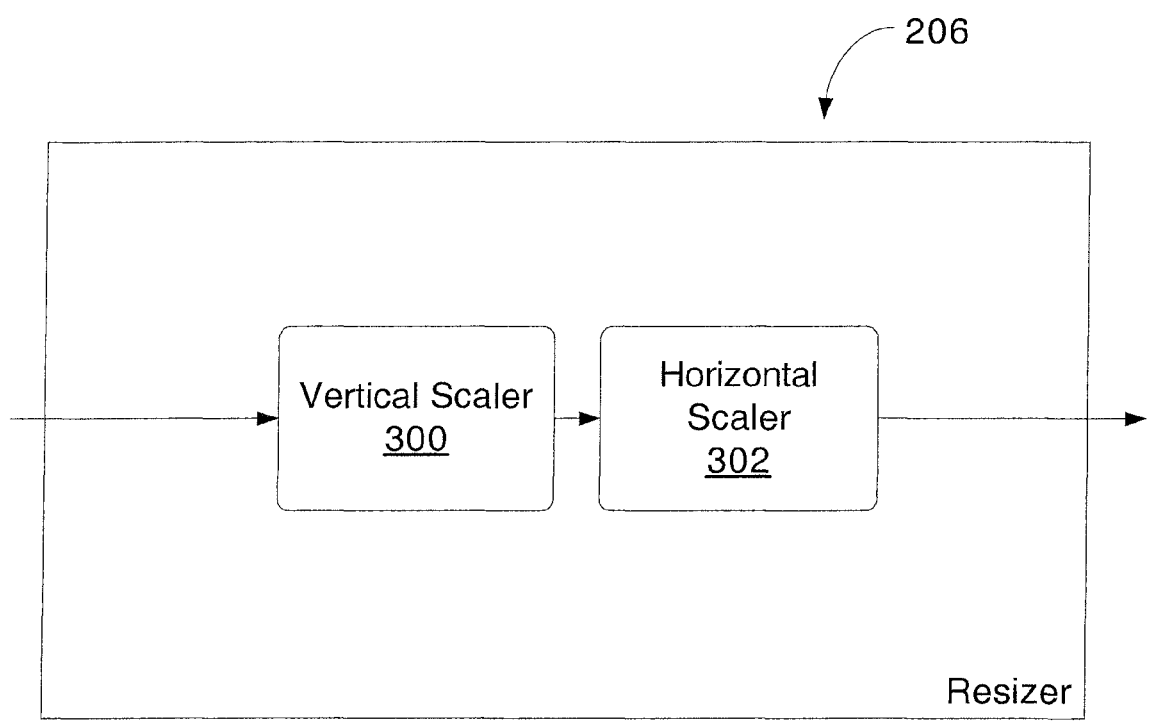
FIG. 3 is a high level schematic illustrating elements within the resizer module 206, in accordance with one embodiment of the present invention.

FIG. 3 is a high level schematic illustrating elements within the resizer module 206, in accordance with one embodiment of the present invention. As shown in FIG. 3, image data is read from memory and passes through a vertical resizer 300. The vertical resizer reads multiple lines of original image data simultaneously. The multiple lines are used to resize and output a single line of image data. The single line of image data is then fed one pixel at a time to the horizontal resizer. The output of the horizontal resizer is the resized image that is sent to the display. Non-uniform image resizer circuitry can be used in both the vertical and horizontal resizers.

Figure 4A:
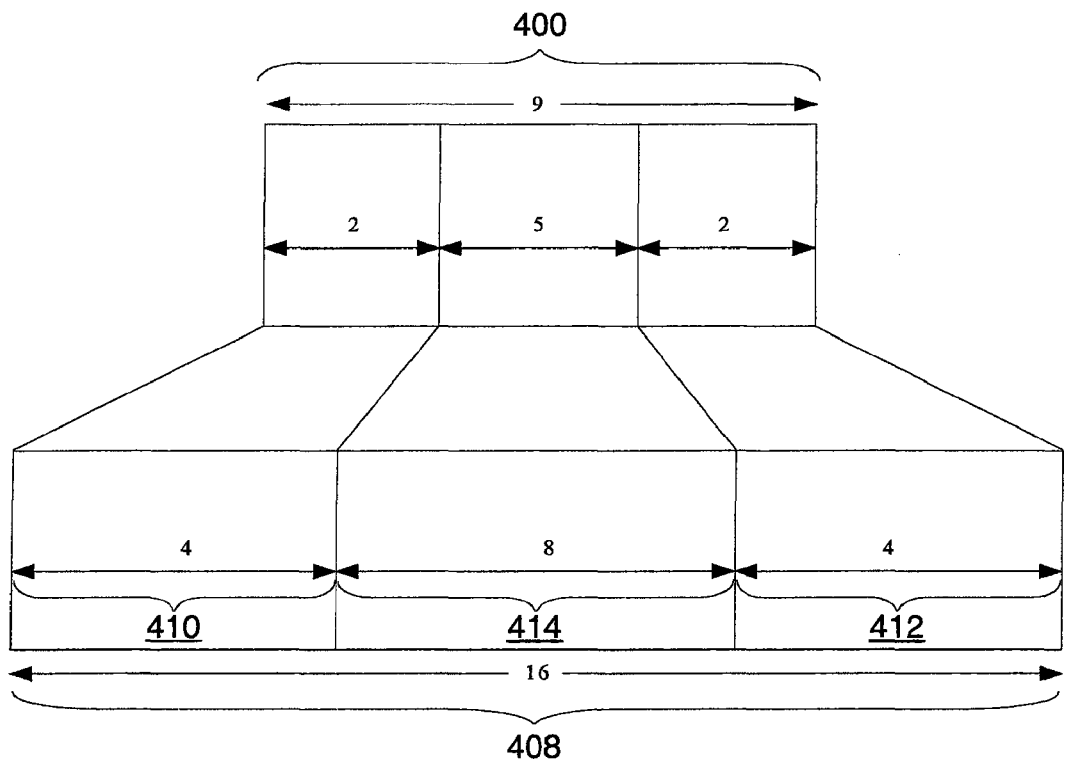
FIGS. 4A and 4B illustrate an original image 400 and a resized image 408 having undergone non-uniform image resizing in accordance with one embodiment of the present invention.
Figure 4B:
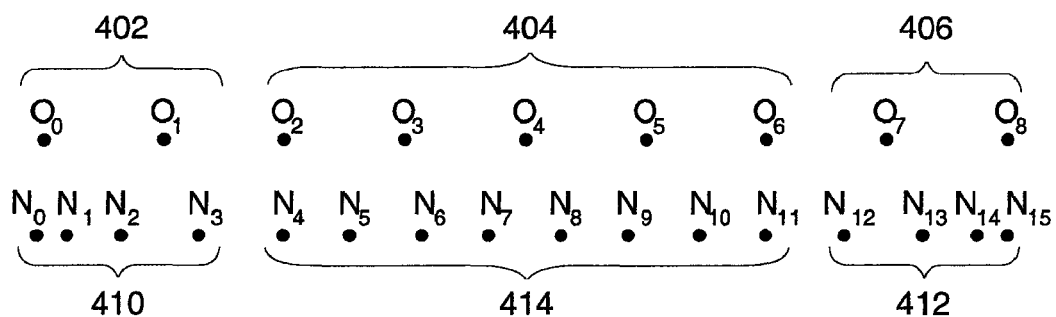

FIGS. 4A and 4B illustrate an input image 400 and an output image 408 having undergone non-uniform image resizing in accordance with one embodiment of the present invention. The input image 400 has an overall pixel width (InWidth) of nine pixels and has an original left side (InNonUniL) 402 width of two pixels, an original center region (InUni) 404 width of five pixels, and an original right side (InNonUniR) 406 width of two pixels. The output image 408 has an overall pixel width (OutWidth) of 16 pixels and has a resized left side (OutNonUniL) 410 width of four pixels, a resized center region (OutUni) 414 width of eight pixels, and a resized right side (OutNonUniR) 412 width of four pixels. The change in overall size between the input image 400 and the output image 408 illustrated in FIG. 4A is arbitrary and should not be considered limiting. Furthermore, the scaling of InUni 404, InNonUniL 402, and InNonUniR 406 is strictly exemplary and should not be considered limiting. Those skilled in the art will recognize that various scaling factors can be applied depending on particular applications and hardware constraints.

As shown in FIGS. 4A and 4B, OutUni 414 has been uniformly scaled while the OutNonUniL 410 and OutNonUniR 412 have been non-uniformly scaled. As the focal point of many images is often centered within the image, uniformly scaling OutUni can reduce the amount of distortion at the focal point between the input image 400 and the output image 408. This can allow images taken using a 4:3 aspect ratio to be scaled to fit a 16:9 aspect ratio while minimizing distortion between the center region of the original image and the center region of the resized image.

Figure 5A:
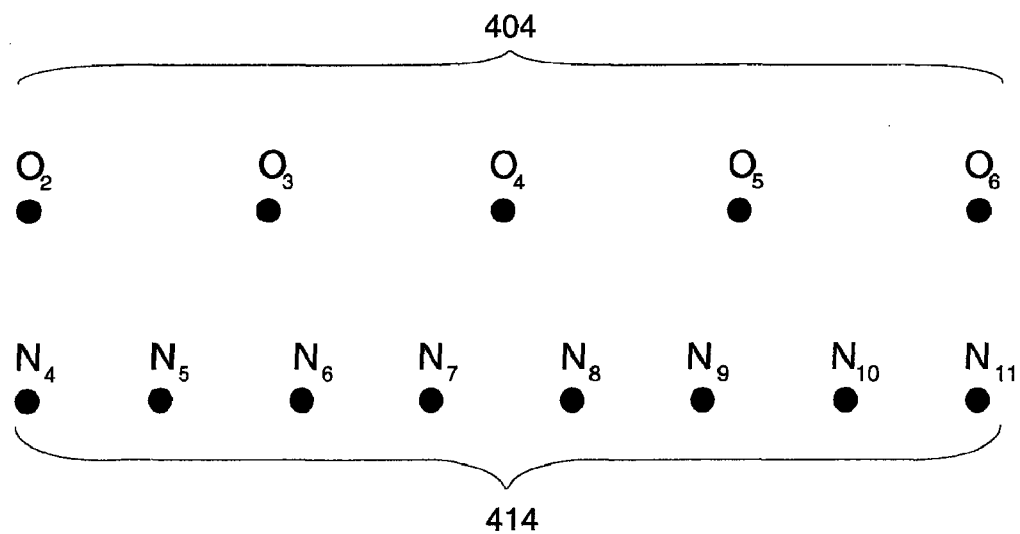
FIGS. 5A through 5D illustrate uniformly resizing the center region of the original image in accordance with embodiments of the present invention.

FIGS. 5A through 5D illustrate uniformly resizing the InUni in accordance with embodiments of the present invention. FIG. 5A illustrates having five original pixels $O_2$-$O_6$, being resized into eight new pixels, $N_4$-$N_{11}$. Thus, the input image has four equally spaced gaps that will be expanded to seven equally spaced gaps in the output image. This can be used to determine a uniform scale factor ($S_0$) based on the following equation:

$$\text{Uniform scale factor} = S_0 = \frac{(InUni - 1)}{(OutUni - 1)} = \frac{4}{7}$$

In some embodiments when the scale factor is less than one, the output image will be "zoomed in" on a portion of the input image. Conversely, in some embodiments when the scale factor is greater than one, the output image will be "zoomed out" when compared to the input image. Using fixed-point math, with seven bits of integer and nine bits of decimal, the uniform scale factor calculation becomes:

$$S_0 = 2^9 \times \frac{(\text{original width} - 1)}{(\text{new width} - 1)} = 512 \times \frac{4}{7} = 292 \text{ remainder } 4$$

Figure 5B:
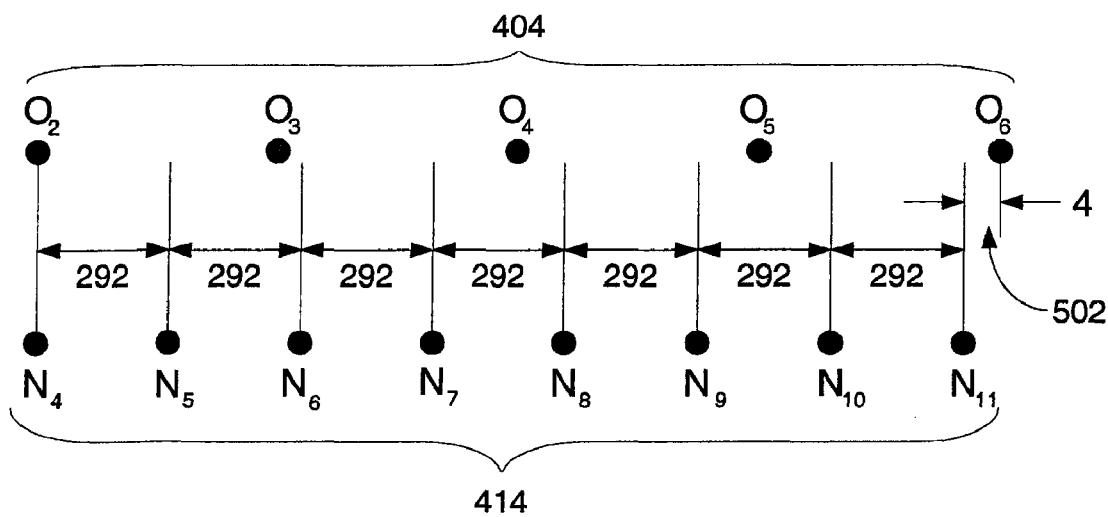
Figure 5C:
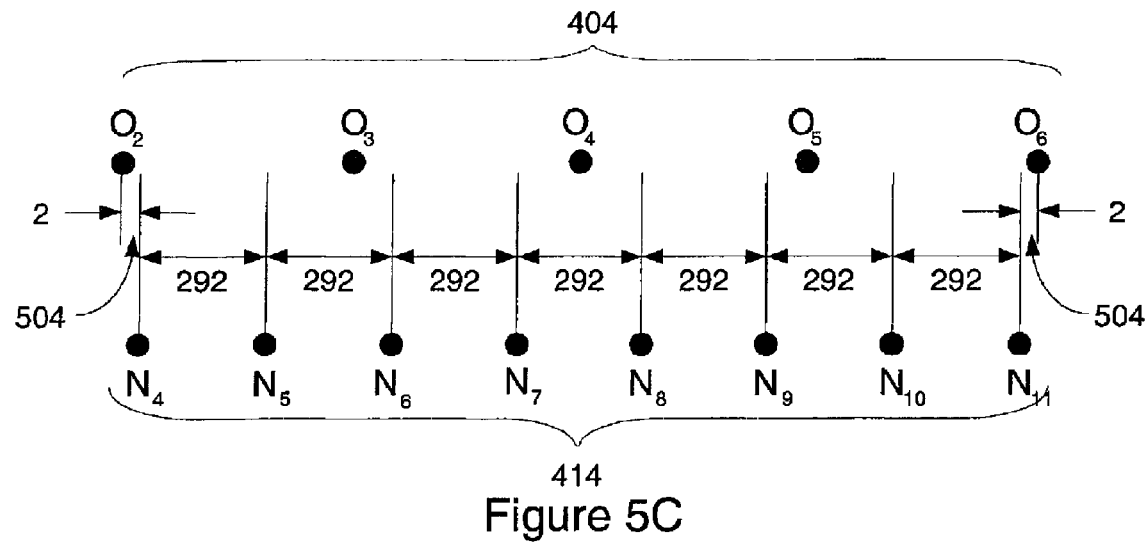

In some embodiments, there is an accumulator to which the scale factor is added. For zooming, a pixel is output after each addition of the scale factor to the accumulator. Thus, the scale factor results in the new pixels $N_4$-$N_{11}$ being evenly spaced by 292 subpixels, as shown in FIG. 5B. However, as illustrated above and in FIG. 5B, because of the finite precision of the calculation in hardware, some scale factors will not work out to integers and there will be a remainder 502 left over. Without offsetting the position of the new pixels, the remainder 502 would result in OutUni 414 being off center between the first and last pixels of InUni 404. As shown in FIG. 5B, pixel $N_{11}$ of OutUni 414 does not line up exactly with pixel $O_6$ of InUni 404. FIG. 5C provides an illustration where the new pixels $N_4$-$N_{11}$ are centered between original pixels $O_2$ and $O_6$, by calculating an accumulator offset value 504. The following equations can be used to determine the accumulator offset value:

$$\text{accumulator offset} = AccStart_{Uni}$$
$$= \frac{\text{uniform scale factor remainder}}{2}$$
$$= \frac{4}{2} = 2$$

Figure 5D:
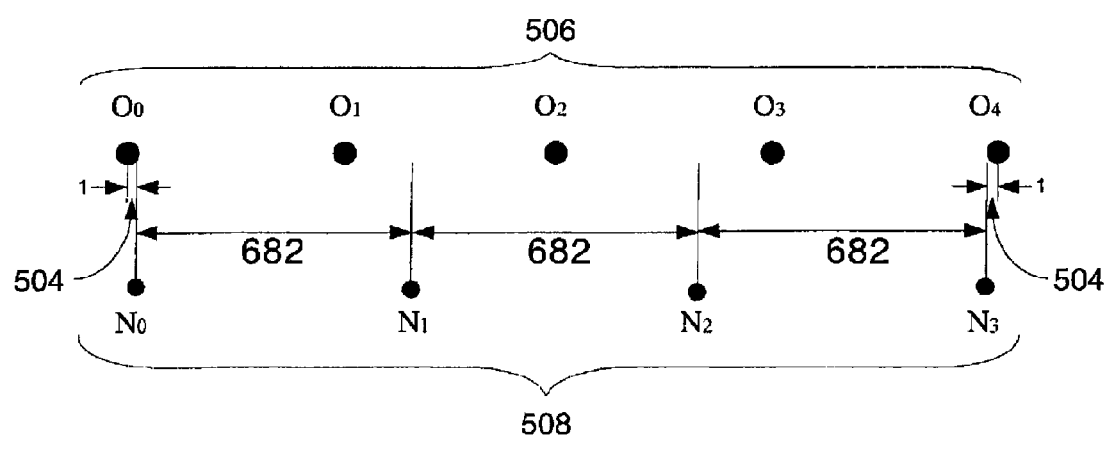

FIG. 5D illustrates that the same principles of uniform scaling can be applied to shrinking an image as well. FIG. 5D illustrates five original pixels $O_0$-$O_4$ 506 that are shrunken to four new pixels $N_0$-$N_3$ 508. Using fixed-point math with seven bits of integer and nine bits of decimal, the calculation of the uniform scale factor is:

$$S_0 = 2^9 \times \frac{(InUni - 1)}{(OutUni - 1)} = 512 \times \frac{4}{3} = 682 \text{ remainder } 2$$

Thus, the output image has the new pixels $N_0$-$N_3$ 508 being spaced 682 subpixels apart, and is centered between the $O_0$ and $O_4$ of the input image by using a uniform offset 504 that is half of the remainder of the uniform scale factor.

Figure 6A:
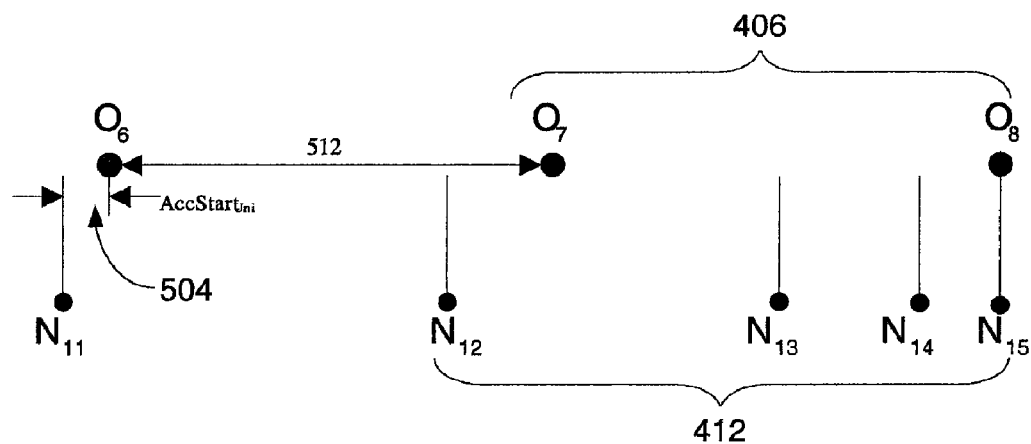
FIG. 6A illustrates input image pixels being non-uniformly scaled, in accordance with one embodiment of the present invention.

FIG. 6A illustrates InNonUniR 406 pixels $O_7$-$O_8$ being non-uniformly scaled to OutNonUniR 412 pixels $N_{12}$-$N_{15}$, in accordance with one embodiment of the present invention. The distance between pixels in the original right side image can be calculated using the following formula where nine bits of decimal are used in the fixed-point calculations and the original width and new width are equal:

$$\text{Original scale factor} = 2^9 \times \frac{(\text{original width} - 1)}{(\text{new width} - 1)} = 512 \times \frac{1}{1} = 512$$

Also shown in FIG. 6A is the pixel $N_{11}$, the rightmost pixel of OutUni. Note that pixel $N_{11}$ is offset from the rightmost pixel of InUni by $AccStart_{Uni}$.

Figure 6B:
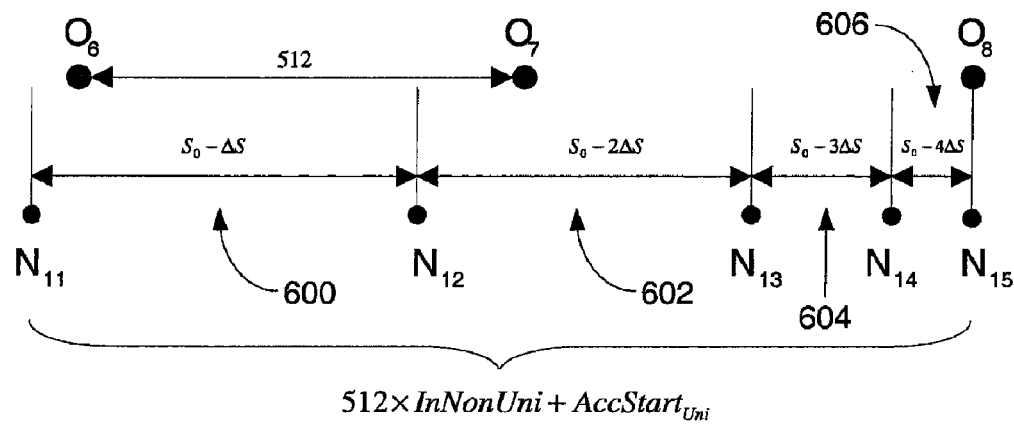
FIG. 6B shows the total distance between the last of the uniformly scaled pixels and the last non-uniformly scaled pixel, in accordance with one embodiment of the present invention.

FIG. 6B shows the total distance between pixel $N_{11}$ of the resized center region and pixel $N_{15}$ of OutNonUniR, in accordance with one embodiment of the present invention. New pixels $N_{12}$-$N_{15}$ can be non-uniformly distributed across a total region that can be calculated using the following formula:

$$N_{11}\text{-}N_{15} \text{ distribution region} = (2^9 \times \text{InNonUni}R) + \text{AccStart}_{Uni}$$

This region is to be divided into OutNonUniR non-uniformly spaced gaps. One limitation is that the difference between any two adjacent gaps must be proportionally the same, i.e. after each output pixel, the distance to the next pixel is decreased by a fixed amount. Thus, a gap 600 between pixel $N_{11}$ and pixel $N_{12}$ can be equal to the uniform scale factor $S_0$ less a non-uniform scale factor delta, $\Delta S$. Similarly, gap 604, between pixel $N_{12}$ and pixel $N_{13}$ is within OutNonUniR and the gap will decrease by a proportional amount of the non-uniform scale factor delta $\Delta S$. Likewise, as shown in FIG. 6B, the gap between pixel $N_{13}$ and pixel $N_{14}$ along with the gap between pixel $N_{14}$ and pixel $N_{15}$ decrease by a proportional amount of $\Delta S$.

In order to calculate the non-uniform scale factor delta $\Delta S$, the following formulas can be used:

$$512 \times InNonUniR + AccStart_{Uni} =$$
$$(S_0 - \Delta S) + (S_0 - 2\Delta S) + \ldots + (S_0 - OutNonUniR \times \Delta S)$$

$$512 \times InNonUniR + AccStart_{Uni} = S_0 \times OutNonUniR - \Delta S \sum_{x=0}^{OutNonUni} x$$

$$512 \times InNonUniR + AccStart_{Uni} =$$
$$S_0 \times OutNonUniR - \frac{1}{2}\Delta S(OutNonUniR)(OutNonUniR + 1)$$

Solving for $\Delta S$ results in:

$$\Delta S = \frac{2(S_0 \times OutNonUniR - 512 \times InNonUniR - AccStart_{Uni})}{OutNonUniR(OutNonUniR + 1)}$$

However, when solving for $\Delta S$ using fixed-point arithmetic with limited precision, the division can result in a remainder. In cases with a remainder, the last pixel of the output image may not necessarily be aligned with the last pixel of the input image. Thus, $\Delta S$ needs to be rounded up or down to the nearest integer.

Figure 6C:
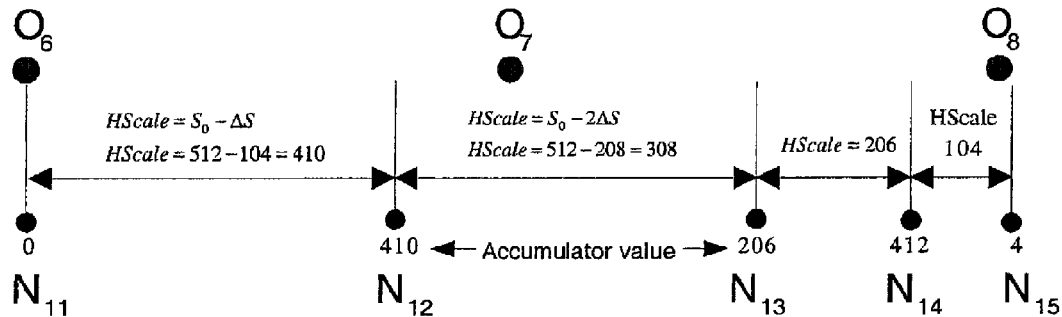
FIG. 6C illustrates an example where the non-uniform scale factor is rounded down in accordance with one embodiment of the present invention.

FIG. 6C illustrates an example where $\Delta S$ is rounded down in accordance with one embodiment of the present invention. In this embodiment, the variables are defined as follows:

InNonUniR=2, OutNonUniR=4, $S_0$=512, and AccStart$_{Uni}$=0.

Solving for $\Delta S$:

$$\Delta S = \frac{2(S_0 \times OutNonUni - 512 \times InNonUni - AccStart_{Uni})}{OutNonUni(OutNonUni + 1)}$$

$$\Delta S = \frac{2(512 \times 4 - 512 \times 2 - 0)}{4(4 + 1)}$$

$$\Delta S = 102 \text{ remainder} = R_\Delta = 8$$

FIG. 6C shows that $\Delta S$ is rounded down to 102 and used to determine proportional non-uniform scale factor deltas that are subtracted from $S_0$. As illustrated in FIG. 6C, the result of rounding $\Delta S$ down is that the last pixel $N_{15}$ of OutNonUniR would be positioned beyond the last pixel $O_8$ of the input image. As illustrated in FIG. 6C, the gap between pixel $N_{11}$ and pixel $N_{12}$, or HScale is calculated by subtracting $\Delta S$ from $S_0$. Note in the uniform region, HScale is equal to $S_0$ but in the non-uniform regions, HScale is defined as the scale factor for the current pixel and is the value that is added to the accumulator. The accumulator value can be reset to zero at the location of pixel $N_{11}$ and pixel $N_{12}$ is output when the accumulator has successfully been incremented by HScale. HScale between pixel $N_{12}$ and pixel $N_{13}$ is 308. Adding HScale for pixel $N_{13}$ to the accumulator value 410 for pixel $N_{12}$ results in 718, but the accumulator resets to zero every 512 subpixels resulting in the accumulator value for pixel $N_{13}$ being 718−512=206.

Figure 6D:
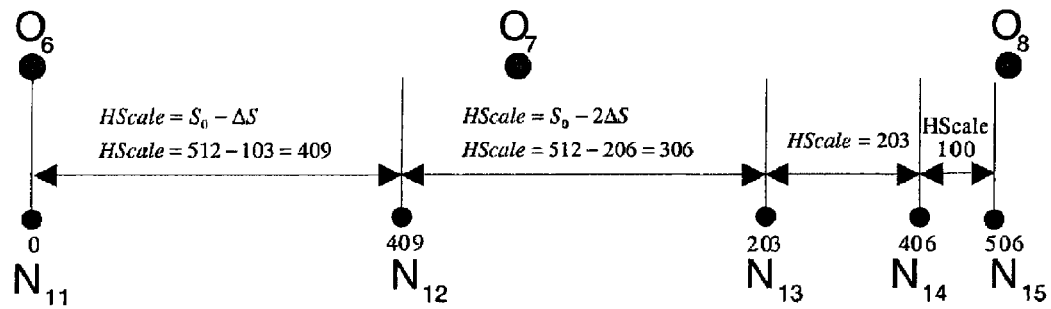
FIG. 6D illustrates an example where the non-uniform scale factor as calculated for FIG. 6C is rounded up in accordance with one embodiment of the present invention.

FIG. 6D illustrates an example where $\Delta S$ as calculated for FIG. 6C is rounded up in accordance with one embodiment of the present invention. This would result in $\Delta S$ being 103 and would result in the last pixel $N_{15}$ of OutNonUniR being positioned inside the last pixel $O_8$ of the input image. From the examples in FIG. 6C and FIG. 6D, the difference between rounding $\Delta S$ up or down is compounded after each output pixel which could result in the last pixel of OutNonUniR being inside or outside of InNonUniR. This problem can be exacerbated for larger values of OutNonUni where the difference between actual and theoretical values can become large. In embodiments where $\Delta S$ is rounded up, the error in the output pixel position, $\epsilon$, introduced after every output pixel can be calculated using the following formula:

$$\varepsilon = \frac{(OutNonUniR)(OutNonUniR + 1) - R_\Delta}{(OutNonUniR)(OutNonUniR + 1)}$$

Thus, the total error, E, when the last pixel is output is:

$$E = \varepsilon + 2\varepsilon + 3\varepsilon + \ldots + OutNonUniR \times \varepsilon$$

$$E = \varepsilon \sum_{x=0}^{OutNonUniR} x$$

$$E = \frac{(OutNonUniR)(OutNonUniR + 1) - R_\Delta}{2(OutNonUniR)(OutNonUniR + 1)} \times$$
$$(OutNonUniR)(OutNonUniR + 1)$$

$$E = \frac{1}{2}[(OuntNonUniR)(OutNonUniR + 1) - R_\Delta]$$

Because the error compounds, for large values of OutNon-UniR, the total error can be very large. Therefore total error can be tracked and adjustments to HScale between adjacent pixels can be made in real-time. As pixels are output, a running total of error can be kept, and anytime the error becomes greater than one, the integer value can be subtracted from the running total of error and added to HScale for the subsequent pixel. To continue the example from FIG. 6C, the additional error introduced for every output pixel is:

$$\varepsilon = \frac{(OutNonUniR)(OutNonUniR + 1) - R_\Delta}{(OutNonUniR)(OutNonUniR + 1)}$$

$$\varepsilon = \frac{(4)(5) - 8}{(4)(5)}$$

$$\varepsilon = \frac{12}{20}$$

Figure 6E:
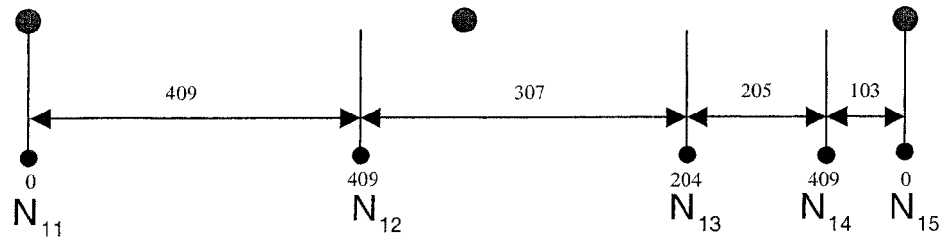
FIG. 6E illustrates error correction values along with the cumulative error that can be used in conjunction with HScale to determine an adjusted HScale, in accordance with one embodiment of the present invention.

So, the error correction added for each output pixel will be:

$$\frac{12}{20}, \frac{24}{20}, \frac{36}{20}, \frac{48}{20}$$

respectively. FIG. 6E illustrates error correction values along with the cumulative error that can be used in conjunction with HScale to determine an adjusted HScale, in accordance with one embodiment of the present invention.

As calculated above, the error correction for pixel $N_{12}$ is $$\frac{12}{20}.$$

As $N_{12}$ is the first non-uniformly scaled pixel, the cumulative error is also $$\frac{12}{20}.$$

As $$\frac{12}{20}$$

is less than one, the integer part of the cumulative error is zero and the adjusted cumulative error is $$\frac{12}{20}.$$

As previously calculated, HScale for pixel $N_{12}$ when rounding $\Delta S$ up is 409 and since there is no adjusted cumulative error, the adjusted HScale is also 409. For pixel $N_{13}$, the error correction is $$\frac{24}{20}$$

as discussed above. Thus, the cumulative error for pixel $N_{13}$ is $$\frac{12}{20} + \frac{24}{20} = \frac{36}{20}.$$

The integer part of the cumulative error is therefore equal to one, and the adjusted cumulative error is $$\frac{36}{20} - 1 = \frac{16}{20}.$$

As previously calculated, when rounding $\Delta S$ up, the HScale for pixel $N_{13}$ is 306. To determine the adjusted HScale, the integer part of the cumulative error is added to HScale resulting in pixel $N_{13}$ have an adjusted HScale value of 307. As shown in FIG. 6E, these calculations can be adjusted and repeated as necessary to determine adjusted HScale values for as many output pixels as needed.

Figure 6F:
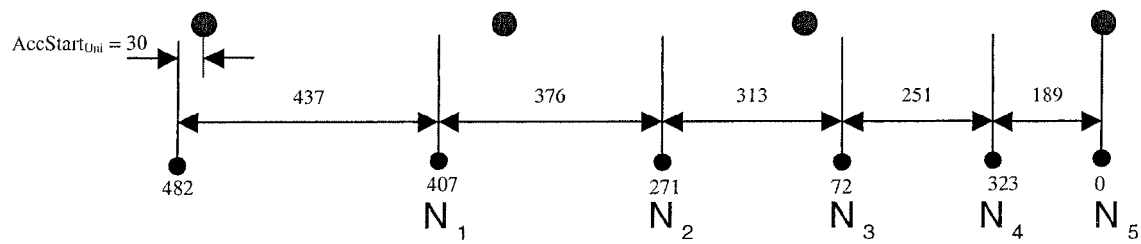
FIG. 6F is a schematic diagram illustrating a technique for determining non-uniformly scaled output pixel locations in accordance with one embodiment of the present invention.

FIG. 6F illustrates determining non-uniformly scaled output pixel locations in accordance with one embodiment of the present invention. In this embodiment the variables are defined as follows:

InNonUniR=3, OutNonUniR=5, AccStart$_{Uni}$=30, $S_0$=500

Thus, $\Delta S$ can be determined using the previously defined formulas:

$$\Delta S = \frac{2(S_0 \times OutNonUniR - 512 \times InNonUniR - AccStart_{Uni})}{OutNonUniR(OutNonUniR + 1)}$$

$$\Delta S = \frac{2(500 \times 5 - 512 \times 3 - 30)}{5(5 + 1)}$$

$$\Delta S = 62 \ R_\Delta = 8$$

rounding up, $\Delta S = 63$

Knowing $\Delta S$, the error introduced after every pixel can be calculated as shown below:

$$\varepsilon = \frac{(OutNonUniR)(OutNonUniR + 1) - R_\Delta}{(OutNonUniR)(OutNonUniR + 1)}$$

$$\varepsilon = \frac{(5)(6) - 8}{(5)(6)}$$

$$\varepsilon = \frac{22}{30}$$

As the error is cumulative, the error added for each output pixel is $$\frac{22}{30}, \frac{44}{30}, \frac{66}{30}, \frac{88}{30}, \frac{110}{30}.$$

With these results, the adjusted HScale for the output pixels can be determined as shown in FIG. 6F.

Figure 7A:
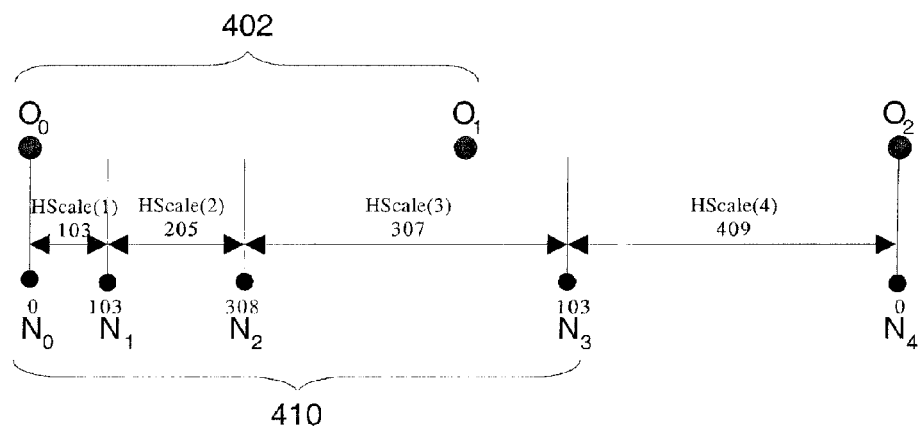
FIG. 7A is an illustration of InNonUniL and OutNonUniL along with the pixels $O_2$ and $N_4$, in accordance with one embodiment of the present invention.

FIG. 7A is an illustration of InNonUniL and OutNonUniL along with the pixels $O_2$ and $N_4$, in accordance with one embodiment of the present invention. The positioning of pixels on the left side of the image is a mirror of the positioning of pixels on the right side. Using the techniques described in FIG. 6E, the last pixel of the output image can always be aligned with the last pixel of the input image. Therefore, on the left side, the first pixel of the output image can be aligned with the first pixel of the input image, and therefore, the start value for the accumulator at the beginning of a line can be set to zero. Next, an initial value of HScale can be calculated using the following formula:

$$HScale_{Start} = S_0 - \Delta S \times OutNonUniL$$

The calculation for $HScale_{Start}$ must still be modified to take into account error. The total cumulative error in HScale for the last pixel on the right side of OutNonUniL can be determined using the following formula:

$$E_{last} = \varepsilon + 2\varepsilon + 3\varepsilon + \ldots + OutNonUniL \times \varepsilon$$

$$E_{last} = \frac{(OutNonUniL)(OutNonUniL + 1) - R_\Delta}{2(OutNonUniL)(OutNonUniL + 1)} \times$$

$$(OutNonUniL)(OutNonUniL + 1)$$

While this calculation results in the cumulative error, the incremental error between the last pixel and the second to last pixel needs to be determined. The incremental error between two adjacent pixels can be calculated by determining the difference in their cumulative errors. The cumulative error for the second to last pixel on the right side can be determined using the following equation:

$$E_{2nd\ last} = \frac{(OutNonUniL)(OutNonUniL+1) - R_\Delta}{2(OutNonUniL)(OutNonUniL+1)} \times (OutNonUniL-1)(OutNonUniL)$$

In some embodiments, the result is always truncated to the integer portion. $HScale_{Start}$ can now be corrected by adding the difference between $E_{last}$ and $E_{2nd\ last}$, resulting in:

$$HScale_{Start} = HScale(1) = S_0 - \Delta S \times OutNonUniL + (E_{last} - E_{2nd\ last})$$

Using the same equations and substituting in the appropriate values, additional differences in cumulative error for adjacent pixels can be calculated so the next values of HScale will be:

$$HScale(2) = S_0 - \Delta S \times (OutNonUniL-1) + (E_{2nd\ last} - E_{3rd\ last})$$

$$HScale(3) = S_0 - \Delta S \times (OutNonUniL-2) + (E_{3rd\ last} - E_{4th\ last})$$

...

$$HScale(x) = S_0 - \Delta S \times (OutNonUniL-x+1) + (E_{x\ last} - E_{x+1\ last})$$

FIG. 7A provides the following values that can be used to determine respective HScale values:

InNonUniL=2, OutNonUniL=4, AccStartUni=0,
$S_0$=512 $\Delta S$=103(rounded up), $R_\Delta$=8

Then:

$$E_{last} = \frac{(OutNonUniL)(OutNonUniL+1) - R_\Delta}{2(OutNonUniL)(OutNonUniL+1)} \times$$
$$(OutNonUniL)(OutNonUniL+1) = \frac{(4)(5)-8}{2(4)(5)} \times (4)(5) = 6$$

$$E_{2nd\ last} = \frac{(OutNonUniL)(OutNonUniL+1) - R_\Delta}{2(OutNonUniL)(OutNonUniL+1)} \times$$
$$(OutNonUniL-1)(OutNonUniL) = \frac{(4)(5)-8}{2(4)(5)} \times (3)(4) = 3$$

$$E_{3rd\ last} = \frac{(OutNonUniL)(OutNonUniL+1) - R_\Delta}{2(OutNonUniL)(OutNonUniL+1)} \times$$
$$(OutNonUniL-2)(OutNonUniL-1) = \frac{(4)(5)-8}{2(4)(5)} \times (2)(3) = 1$$

$$E_{4th\ last} = \frac{(OutNonUniL)(OutNonUniL+1) - R_\Delta}{2(OutNonUniL)(OutNonUniL+1)} \times$$
$$(OutNonUniL-3)(OutNonUniL-2) = \frac{(4)(5)-8}{2(4)(5)} \times (1)(2) = 0$$

$$E_{5th\ last} = \frac{(OutNonUniL)(OutNonUniL+1) - R_\Delta}{2(OutNonUniL)(OutNonUniL+1)} \times$$
$$(OutNonUniL-4)(OutNonUniL-3) = \frac{(4)(5)-8}{2(4)(5)} \times (0)(1) = 0$$

$$HScale(1) = S_0 - \Delta S \times OutNonUni + (E_{last} - E_{2nd\ last}) = 512 - 103 \times 4 + (6-3) = 103$$

$$HScale(2) = S_0 - \Delta S \times (OutNonUni-1) + (E_{2nd\ last} - E_{3rd\ last}) = 512 - 103 \times 3 + (3-1) = 205$$

$$HScale(3) = S_0 - \Delta S \times (OutNonUni-2) + (E_{3rd\ last} - E_{4th\ last}) = 512 - 103 \times 2 + (1-0) = 307$$

$$HScale(4) = S_0 - \Delta S \times (OutNonUni-3) + (E_{4th\ last} - E_{5th\ last}) = 512 - 103 \times 1 + (0-0) = 409$$

As shown in FIG. 7A, between pixel $N_0$ and pixel $N_1$, HScale(1) is 103 and pixel $N_1$ is output when the accumulator reaches 103. Likewise, HScale(2) between pixel $N_1$ and pixel $N_2$ is determined to be 205 and the pixel $N_2$ is output when the accumulator reaches 308. Pixels $N_3$ and $N_4$ are similarly output in their respective locations after having HScale(x) added to the previous pixel location and the accumulator resets to zero after reaching 512.

Figure 7B:
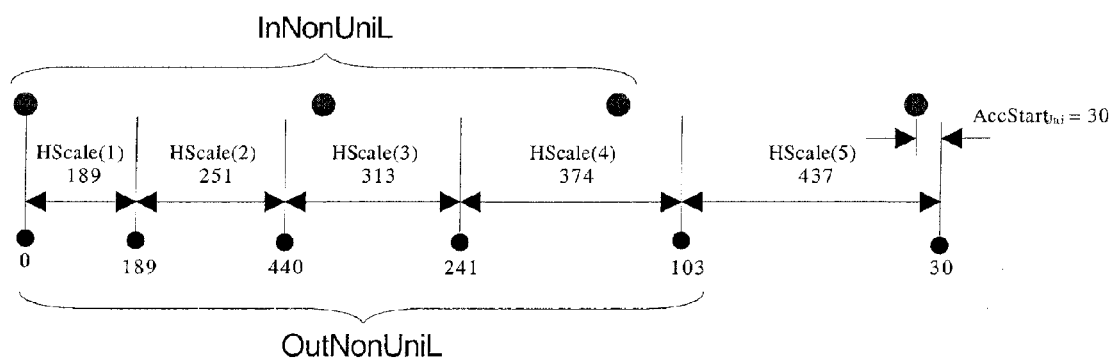
FIG. 7B is an illustration of InNonUniL and OutNonUniL and the first pixels of InUni and OutUni, in accordance with one embodiment of the present invention.

FIG. 7B is an illustration of InNonUniL and OutNonUniL and the first pixels of InUni and OutUni, in accordance with one embodiment of the present invention. FIG. 7B illustrates the result of non-uniformly scaling three InNonUni pixels into five OutNonUni pixels. Thus, the following values are used to determine various HScale values in FIG. 7B:

InNonUniL=3, OutNonUniL=5, AccStartUni=30,
$S_0$=500 $\Delta S$=63 (rounded up), $R_\Delta$=8

Then:

$$E_{last} = \frac{(OutNonUniL)(OutNonUniL+1) - R_\Delta}{2(OutNonUniL)(OutNonUniL+1)} \times$$
$$(OutNonUniL)(OutNonUniL+1) = \frac{(5)(6)-8}{2(5)(6)} \times (5)(6) = 11$$

$$E_{2nd\ last} = \frac{(OutNonUniL)(OutNonUniL+1) - R_\Delta}{2(OutNonUniL)(OutNonUniL+1)} \times$$
$$(OutNonUniL-1)(OutNonUniL) = \frac{(5)(6)-8}{2(5)(6)} \times (4)(5) = 7$$

$$E_{3rd\ last} = \frac{(OutNonUniL)(OutNonUniL+1) - R_\Delta}{2(OutNonUniL)(OutNonUniL+1)} \times$$
$$(OutNonUniL-2)(OutNonUniL-1) = \frac{(5)(6)-8}{2(5)(6)} \times (3)(4) = 4$$

$$E_{4th\ last} = \frac{(OutNonUniL)(OutNonUniL+1) - R_\Delta}{2(OutNonUniL)(OutNonUniL+1)} \times$$
$$(OutNonUniL-3)(OutNonUniL-2) = \frac{(5)(6)-8}{2(5)(6)} \times (1)(2) = 2$$

$$E_{5th\ last} = \frac{(OutNonUniL)(OutNonUniL+1) - R_\Delta}{2(OutNonUniL)(OutNonUniL+1)} \times$$
$$(OutNonUniL-4)(OutNonUniL-3) = \frac{(5)(6)-8}{2(5)(6)} \times (0)(1) = 0$$

$$E_{6th\ last} = \frac{(OutNonUniL)(OutNonUniL+1) - R_\Delta}{2(OutNonUniL)(OutNonUniL+1)} *$$
$$(OutNonUniL-5)(OutNonUniL-4) = \frac{(5)(6)-8}{2(5)(6)} \times (0)(1) = 0$$

$$HScale(1) = S_0 - \Delta S \times OutNonUniL + (E_{last} - E_{2nd\ last}) = 500 - 63 \times 5 + (11-7) = 189$$

$$HScale(2) = S_0 - \Delta S \times (OutNonUniL-1) + (E_{2nd\ last} - E_{3rd\ last}) = 500 - 63 \times 4 + (7-4) = 251$$

$$HScale(3) = S_0 - \Delta S \times (OutNonUniL-2) + (E_{3rd\ last} - E_{4th\ last}) = 500 - 63 \times 3 + (4-2) = 313$$

Figure 8:
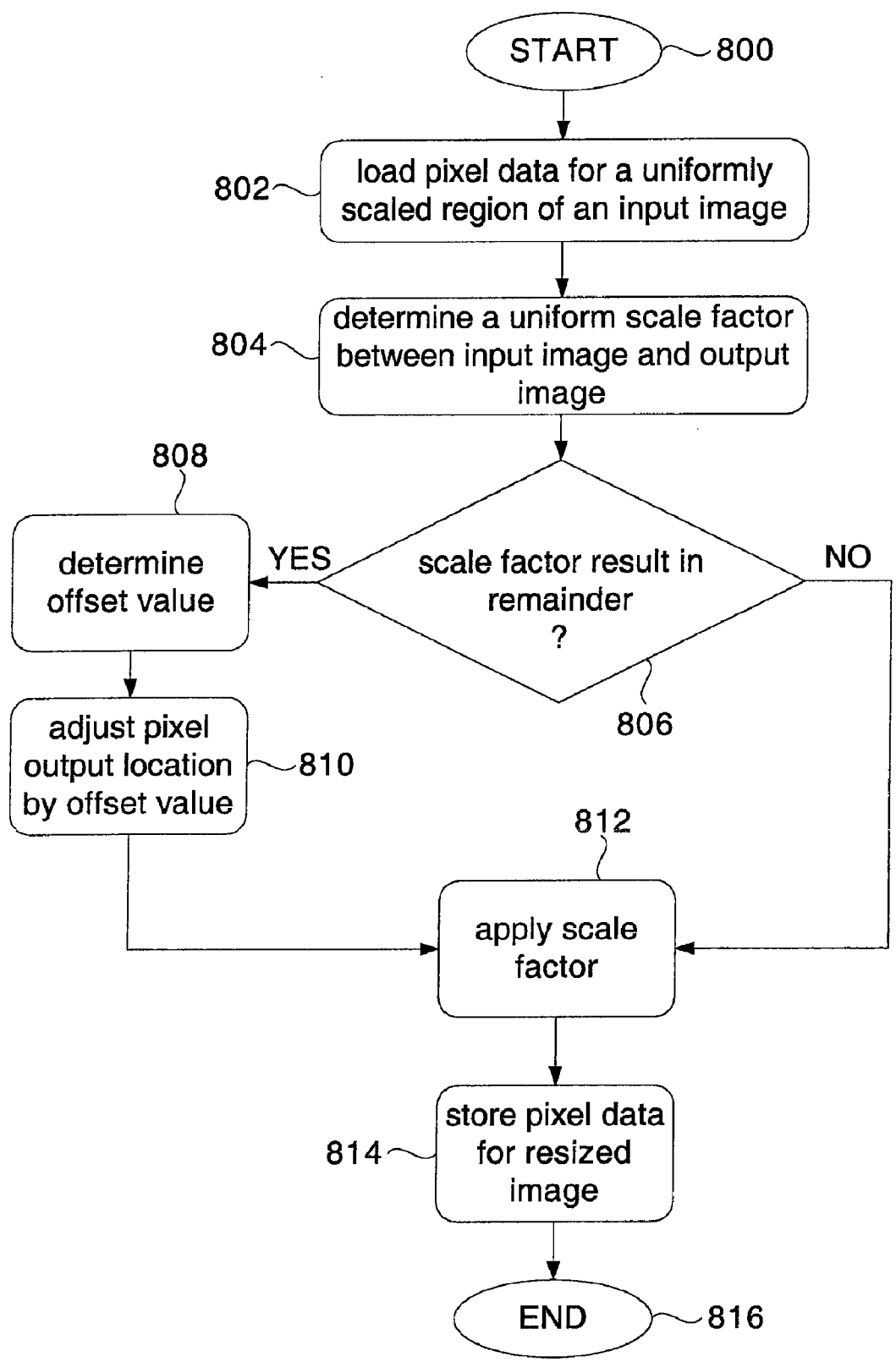
FIG. 8 is a flowchart illustrating the operations that performs uniform resizing in accordance with one embodiment of the present invention.

$H\text{Scale}(4)=S_0-\Delta S\times(\text{OutNonUni}L-3)+$
    $(E_{4th\ last}-E_{5th\ last})=500-63\times2+(2-0)=374$ $H\text{Scale}(5)=S_0-\Delta S\times(\text{OutNonUni}L-4)+$
    $(E_{5th\ last}-E_{6th\ last})=500-63\times1+(0-0)=437$ FIG. 8 is a flowchart illustrating the operations that perform a uniform resizing procedure in accordance with one embodiment of the present invention. Operation 800, START, begins the procedure. Operation 802 loads pixel data for a uniformly scaled region of an input image. It should be appreciated that in one embodiment, the pixel data includes pixel location data. In operation 804, a uniform scale factor is determined based on the desired output image as discussed in FIG. 5A. In the embodiment illustrated in FIG. 8, the output image will have a uniformly scaled region that will be positioned to appear centered relative to the original image after being resized. As previously discussed in FIG. 5A and FIG. 5B, in order to center the output image relative to the input image, operation 806 determines whether the uniform scale factor calculation results in a remainder.

If the uniform scale factor calculation results in a remainder, an offset value is determined in operation 808, as discussed in FIGS. 5C-5D. Operation 810 loads the accumulator by the offset value. Operation 812 applies the scale factor to the pixel data of the input image. In other operations, operation 814 stores the pixel data for the output image in a memory location while operation 816 terminates the procedure. Note that in embodiments where the output image does not need to be centered relative to the original image, operation 808 and operation 810 do not need to be performed.

If operation 806 determines that the scale factor will not result in a remainder, operation 812 applies the scale factor to the pixel data for the input image. In other operations, operation 814 stores the pixel data for the resized image in a memory location and operation 816 terminates the procedure.

Figure 9:
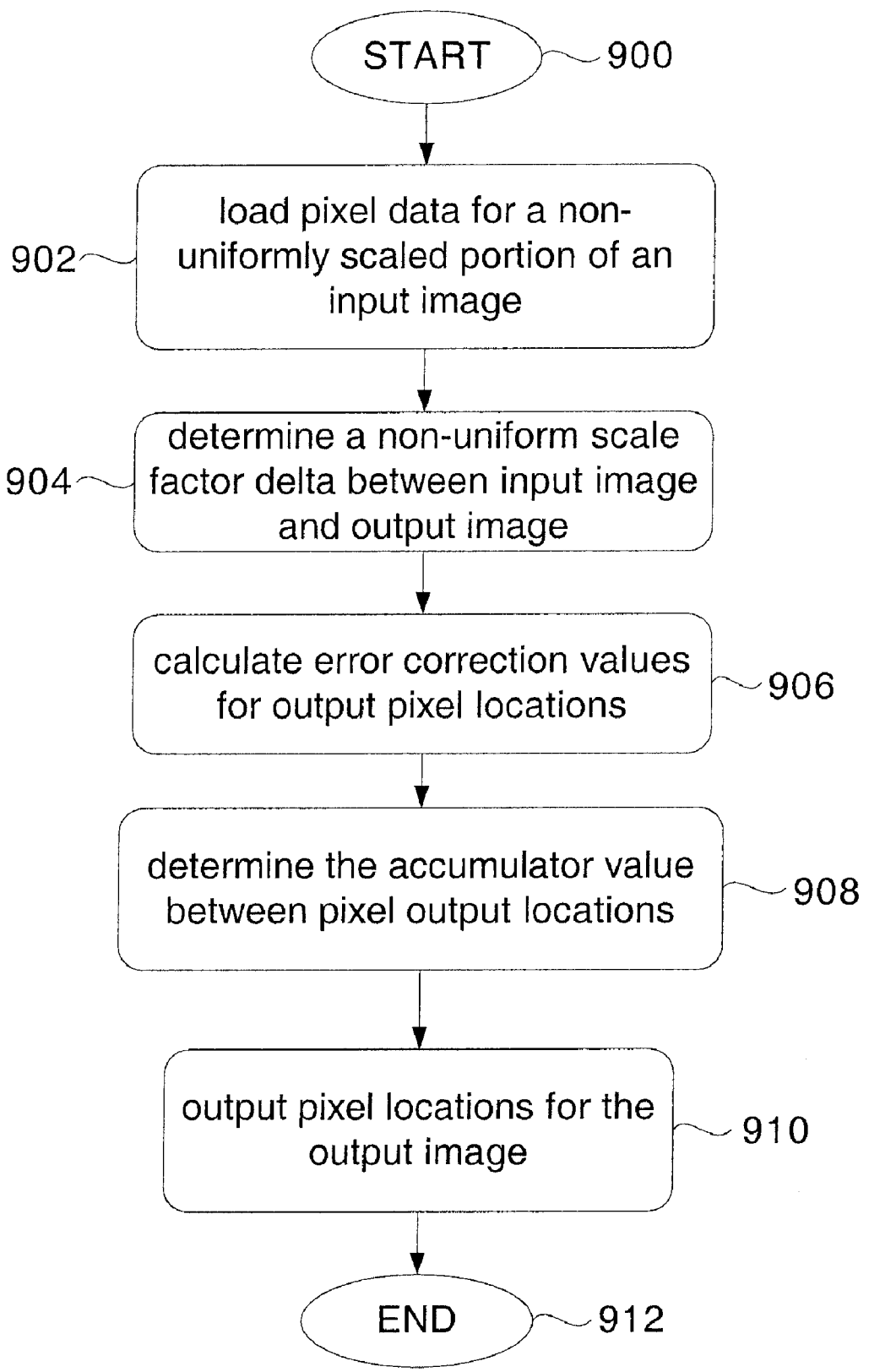
FIG. 9 is a flowchart illustrating the operations that performs non-uniformly based resizing in accordance with one embodiment of the present invention.

FIG. 9 is a flowchart illustrating operations that perform non-uniformly based resizing for an input image in accordance with one embodiment of the present invention. In one embodiment, the input image data is processed in raster sequence resulting in different steps to calculate the output pixel locations on the left side versus the steps to calculate the output pixel locations on the right side. The techniques to calculate the output pixel locations were previously discussed in FIGS. 6A-6E and FIGS. 7A-7B. In operation 900, START beings the procedure. Operation 902 loads pixel data for a non-uniformly scaled region of an input image where the pixel data includes pixel location data. In operation 904, a non-uniform scale factor delta is determined between the input image and the output image, as previously discussed in FIG. 6B. In the embodiments illustrated and described for FIG. 6D, if the calculation of the non-uniform scale factor delta results in a remainder, the non-uniform scale factor delta is rounded up. In other embodiments that may require different calculations than those previously discussed, the non-uniform scale factor delta can be rounded down.

In operation 906, error correction values for output pixel locations are calculated. As previously discussed in FIGS. 6E-6F and FIGS. 7A-7B, different techniques may be applied to determine error correction values. Similarly, as previously detailed in FIGS. 6E-6F and FIG. 7A-7B, in Operation 908, error correction values from operation 906 can be used to determine accumulator values for output pixel locations. In another operation, operation 910 outputs the pixel data for the resized image while operation 912 terminates the procedure.

It will be apparent to one skilled in the art that the functionality described herein may be synthesized into firmware through a suitable hardware description language (HDL). For example, the HDL, e.g., VERILOG, may be employed to synthesize the firmware and the layout of the logic gates for providing the necessary functionality described herein to provide a hardware implementation of the resizing techniques and associated functionalities.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for producing a scaled output image by manipulating image data from an input image, comprising:
    defining pixel locations within a uniformly scaled region of the output image based on uniformly scaling a portion of the input image;
    determining a non-uniform scale factor delta, the non-uniform scale factor delta defining a gap between pixel locations within a non-uniformly scaled region;
    determining an error correction value for each pixel, the error correction value adjusting each respective pixel location within the non-uniformly scaled region; and
    defining each pixel location for the non-uniformly scaled region of the output image based on a uniform scale factor, increments of the non-uniform scale factor delta, and the error correction value.

2. A method for producing a scaled output image as in claim 1, wherein a first non-uniformly scaled region is positioned left of the uniformly scaled region in a width direction of the output image and a second non-uniformly scaled region is positioned right of the uniformly scaled region in a width direction of the output image.

3. A method for producing a scaled output image as in claim 2, wherein a first technique is used to determine pixel locations within the first non-uniformly scaled region and a second technique is used to determine pixel locations within the second non-uniformly scaled region.

4. A method for producing a scaled output image as in claim 1, wherein values of the non-uniform scale factor delta are rounded up to a nearest integer.

5. A method for producing a scaled output image as in claim 1, wherein the increments of the non-uniform scale factor delta are multiples of the non-uniform scale factor delta.

6. A method for producing a scaled output image as in claim 1, wherein the method is performed with hardware of a graphics-processing unit.

7. A method for resizing image data from a first image size to a second image size, comprising;
    uniformly resizing a first region of the image data in the first image size through a constant scale factor based on a number of gaps between pixels in the first region of the image data in the first image size and a number of gaps between pixels in a corresponding first region of the image data in the second image size; and
    non-uniformly resizing a second region of the image data in the first image size through a changing scale factor for each pixel location of the second region of the image data in the first image size to define pixel locations for a corresponding second region of the second image size.

8. A method for resizing image data as in claim 7, further comprising:
    non-uniformly resizing a third region of the image data in the first image size through a changing scale factor for each pixel location of the third region of the image data in the first image size to define pixel locations for a corresponding third region of the image data in the second image size.

9. A method for resizing image data as in claim 8, wherein the first region of the image data in the second image size is between the second region of the image data in the second image size and the third region of the image data in the second image size.

10. A method for resizing image data as in claim 7, wherein error correction values compensate for rounding errors when calculating pixel locations within the second region of the image data in the second image size.

11. A method for resizing image data as in claim 10, wherein non-uniform scale factor delta values are rounded up to a nearest integer.

12. A method for resizing image data as in claim 8, wherein a first technique is used to calculate pixel locations within the image data in the second region of the second image size and a second technique is used to calculate pixel locations within the image data in the third region of the second image size.

13. A resizer for scaling image data, comprising:
a non-uniform resizer, the non-uniform resizer configured to apply a non-uniform scale factor based on a number of gaps between uniformly spaced pixels in an input image and a number of gaps between pixels in a region of non-uniformly scaled pixels in an output image, the non-uniform resizer further configured to determine and apply pixel offset values to identify output pixel locations within the output image.

14. The resizer for scaling image data as in claim 13, further comprising:
a uniform resizer, the uniform resizer configured to apply a uniform scale factor based on a number of gaps between pixels in a uniformly spaced region of the input image and a number of gaps between pixels in a uniformly scaled region of the output image.

15. The resizer for scaling image data as in claim 14, wherein the uniformly scaled region in the output image is located between a first non-uniformly scaled region and a second non-uniformly scaled region.

16. The resizer for scaling image data as in claim 14, wherein the non-uniform resizer and the uniform resizer are integrated into a graphics processing unit.

17. A method for resizing an input image, comprising:
determining a non-uniform scale factor delta, the non-uniform scale factor delta defining gaps between output pixels within a non-uniformly scaled region;
determining an error correction value for each output pixel value, the error correction value adjusting each respective output pixel location within the non-uniformly scaled region, and
defining each output pixel location within the non-uniformly scaled region of an output image based on a uniform scale factor, increments of the non-uniform scale factor delta and the error correction value.

18. The method for resizing an input image as in claim 17, further comprising:
determining the uniform scale factor, the uniform scale factor defining a gap between output pixels within a uniformly scaled region, and
determining an offset value to adjust the output pixels within the uniformly scaled region.

19. The method for resizing an input image as in claim 18, wherein the uniform scale factor is applied to a center portion of the input image and the non-uniform scale factor is applied to a right side and a left side of the input image in a width direction of the input image.

20. The method for resizing an input image as in claim 19, wherein a first technique is used to determine error correction values for the right side and a second technique is used to determine error correction values for the left side in a width direction of the input image.

21. The method for resizing an input image as in claim 17, wherein when determining the non-uniform scale factor delta results in a remainder, the non-uniform scale factor delta is rounded up to the nearest integer.

22. The method for resizing an image as in claim 17, wherein the increments of the non-uniform scale factor delta are multiples of the non-uniform scale factor delta.

23. The method for resizing an image as in claim 17, wherein the method is performed with hardware of a graphics processing unit.

24. A method for producing a scaled output image as in claim 3, wherein in the first technique used to determine pixel locations within the first non-uniformly scaled region the non-uniform scale factor is rounded up to a nearest integer, and in the second technique used to determine pixel locations within the second non-uniformly scaled region the non-uniform scale factor is rounded down to a nearest integer.

25. A method for resizing image data as in claim 12, wherein in the first technique used to calculate pixel locations within the image data in the second region of the second image size the non-uniform scale factor is rounded up to a nearest integer, and in the second technique used to calculate pixel locations within the image data in the third region of the second image size the non-uniform scale factor is rounded down to a nearest integer.

26. A method for resizing image data as in claim 20, wherein in the second technique the error correction values are compounded and in the first technique a running total of the error correction values are kept and anytime the total becomes greater than one, an integer value is subtracted from the total.

* * * * *